Sept. 25, 1923.  W. STEELE  1,469,195
HARROW
Filed Sept. 27, 1920   2 Sheets-Sheet 1

Wesley Steele
INVENTOR

BY Victor J. Evans
ATTORNEY

E. R. Ruppert
WITNESS:

Sept. 25, 1923.

W. STEELE

HARROW

Filed Sept. 27, 1920

Wesley Steele
INVENTOR

BY Victor J. Evans
ATTORNEY

WITNESS:

Patented Sept. 25, 1923.

1,469,195

UNITED STATES PATENT OFFICE.

WESLEY STEELE, OF DOUBLE SPRINGS, ALABAMA, ASSIGNOR OF ONE-HALF TO W. F. GUTTERY, OF DOUBLE SPRINGS, ALABAMA.

HARROW.

Application filed September 27, 1920. Serial No. 412,910.

*To all whom it may concern:*

Be it known that I, WESLEY STEELE, a citizen of the United States, residing at Double Springs, in the county of Winston and State of Alabama, have invented new and useful Improvements in Harrows, of which the following is a specification.

This invention relates to harrows and has for an object the provision of a harrow which embodies fender blades, secured to the frame of the harrow by means which permit them to rise so as to pass over obstructions, the manner of connecting the fender blades to the frame permitting of great flexibility of movement.

Other objects and advantages of the invention will appear as the following description is read in connection with the accompanying drawings.

In the drawings:—

Figure 1:
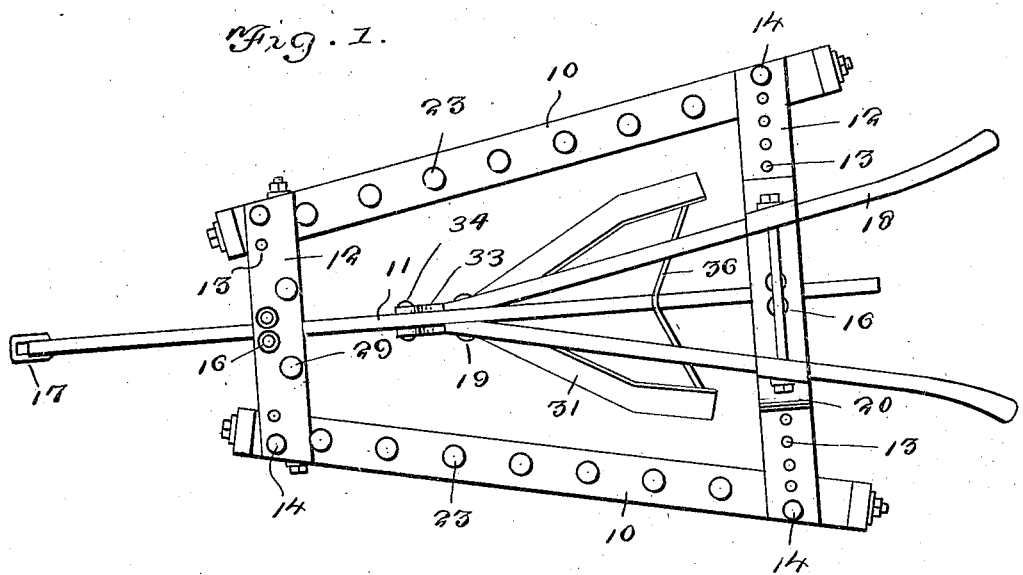
Figure 1 is a plan view of the harrow embodying the present invention.
Figure 2:
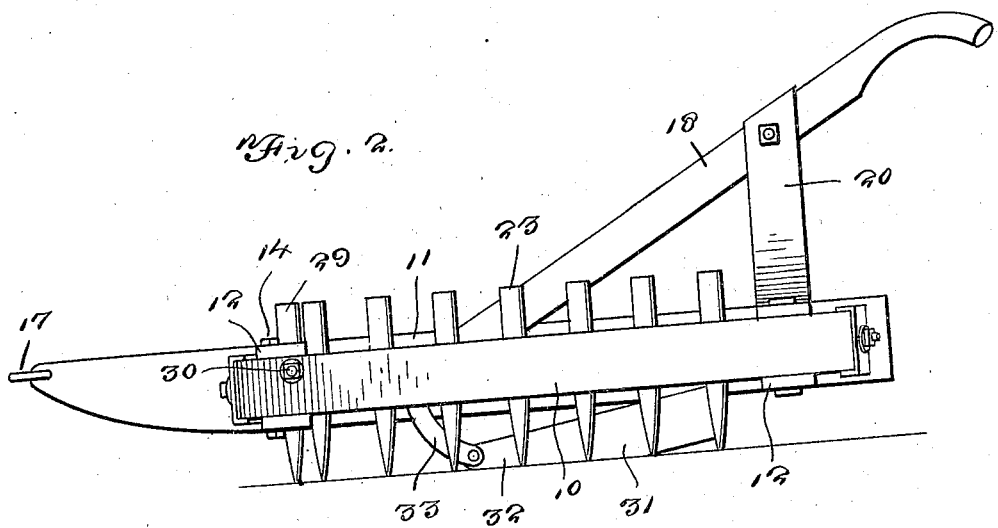
Figure 2 is a side view of the same.
Figure 3:
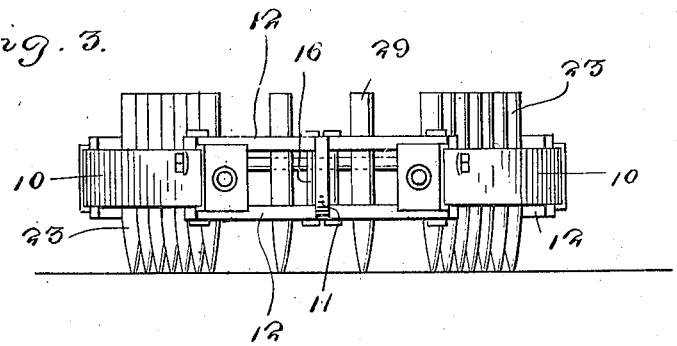
Figure 3 is a front elevation.
Figure 4:
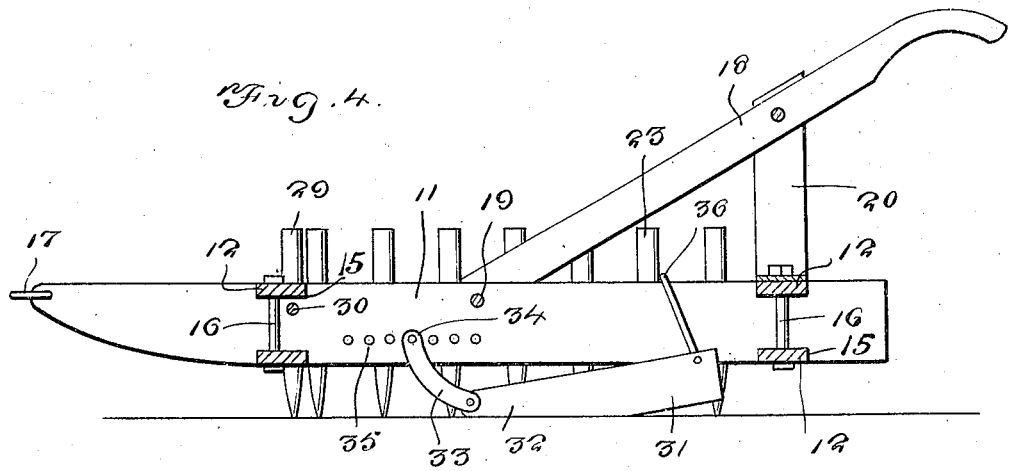
Figure 4 is a central vertical longitudinal section.

Referring in detail to the drawings, wherein like characters of reference denote corresponding parts, the harrow comprises a frame which includes longitudinally extending side bars 10 and a longitudinally extending center bar 11, the said bars being connected at their forward and rear ends by means of upper and lower transverse bars 12. The bars 12 are similar in construction, except that the forward upper and lower bars are shorter than the rear bars. Each of these transverse bars is provided at each end with spaced openings 13 for the passage of bolts 14, the latter extending downwardly through openings provided in the side bars 10. By this means both the forward and rear ends of the bars 10 may be relatively adjusted. The transverse bars 12 are received within notches 15 provided in the center bar 11, while bolts 16 connect the upper and lower bars 12, being disposed upon opposite sides of the center bar 11, so that lateral movement of this last mentioned bar is prevented. The center bar 11 extends forwardly beyond the ends of the bars 10 and carries a clevis 17 for connection with a suitable traction medium.

Secured to the center bar 11 are upwardly and rearwardly extending handles 18, which are connected at one end by a bolt 19, the handles being also connected to one of the bars 12 by braces 20. The members are connected to the frame by means of the bolts 16 of the rear transverse bars 12.

Located upon opposite sides of the center bar 11 are fenders 31, the said fenders extending rearwardly and outwardly and being tapered at their forward ends as indicated at 32. The forward ends of the fenders are pivotally connected to links 33, which are in turn pivotally mounted upon bolts 34, the latter being adapted to be positioned in any one of a number of spaced openings 35 provided in the center bar 11. The rear ends of the fenders 31 are connected by means of link 36 which engage over the center bar 11.

The invention is susceptible of various changes in its form, proportions and minor details of construction and the right is herein reserved to make such changes as properly fall within the scope of the appended claim.

Having described the invention what is claimed is:—

A harrow comprising a frame including side bars, a center bar connected to the side bars, teeth carried by the last mentioned bars, fenders positioned upon opposite sides of the center bar, links having one of their ends pivotally secured to the center bar and their opposite ends pivotally secured to the forward ends of the fenders and a link connecting the rear ends of the fenders and extending transversely across and engaging the center bar.

In testimony whereof I affix my signature.

WESLEY STEELE.